(12) United States Patent
Zheng et al.

(10) Patent No.: US 10,897,947 B2
(45) Date of Patent: Jan. 26, 2021

(54) SMART HELMET FALL DETECTION METHOD AND SMART HELMET

(71) Applicant: SHENZHEN QIANHAI LIVALL IOT TECHNOLOGY CO., LTD., Guangdong (CN)

(72) Inventors: Bo Zheng, Guangdong (CN); Yongzheng Ye, Guangdong (CN); Xiangling Yi, Guangdong (CN)

(73) Assignee: SHENZHEN QIANHAI LIVALL IOT TECHNOLOGY CO., LTD., Guangdong (CN)

(*) Notice: Subject to any disclaimer, the term of this patent is extended or adjusted under 35 U.S.C. 154(b) by 15 days.

(21) Appl. No.: 16/461,759

(22) PCT Filed: Nov. 6, 2017

(86) PCT No.: PCT/CN2017/109449
§ 371 (c)(1),
(2) Date: May 16, 2019

(87) PCT Pub. No.: WO2018/137375
PCT Pub. Date: Aug. 2, 2018

(65) Prior Publication Data
US 2019/0357618 A1 Nov. 28, 2019

(30) Foreign Application Priority Data
Jan. 24, 2017 (CN) .......................... 2017 1 0060140

(51) Int. Cl.
*A42B 3/04* (2006.01)
*G01P 13/00* (2006.01)
(Continued)

(52) U.S. Cl.
CPC ............ *A42B 3/046* (2013.01); *A42B 3/0453* (2013.01); *G01P 13/00* (2013.01); *G01P 15/18* (2013.01);
(Continued)

(58) Field of Classification Search
CPC combination set(s) only.
See application file for complete search history.

(56) References Cited

U.S. PATENT DOCUMENTS 8,843,101 B2 * 9/2014 Fish .......................... G01P 1/07
455/404.1
9,648,478 B2 * 5/2017 Fish .................. H04M 1/72538
(Continued)

FOREIGN PATENT DOCUMENTS

| CN | 105054894 A | 11/2015 |
| CN | 105105762 A | 12/2015 |

(Continued)

OTHER PUBLICATIONS

Chinese Office Action, Application No. 201710060140.1, dated Jun. 24, 2019, 6 pages.
(Continued)

Primary Examiner — Travis R Hunnings
(74) Attorney, Agent, or Firm — Cantor Colburn LLP

(57) ABSTRACT

The present invention provides a smart helmet falling detection method and a smart helmet. The falling detection method includes following steps: initializing a system, determining a free fall, determining a collision, determining motionlessness, and generating an emergency signal according to a detection result that a motionlessness event occurs within a fourth duration after the collision event occurs. The smart helmet includes a three-axis acceleration sensor and a controller. For the smart helmet falling detection method and the smart helmet provided in the present invention, the
(Continued)

acceleration is measured by the three-axis acceleration sensor installed on the smart helmet, and whether a riding falling event occurs is determined by analyzing change of the acceleration, and alarm is given according to the falling event, such that the problem of falling detection and calling for help in a riding process is solved in a targeted manner.

10 Claims, 2 Drawing Sheets

(51) Int. Cl.
  *G01P 15/18* (2013.01)
  *G01S 19/42* (2010.01)
  *G08B 5/36* (2006.01)
  *G08B 21/04* (2006.01)

(52) U.S. Cl.
  CPC ............... *G01S 19/42* (2013.01); *G08B 5/36* (2013.01); *G08B 21/043* (2013.01); *G08B 21/0446* (2013.01)

(56) References Cited

U.S. PATENT DOCUMENTS

| | | | | |
|---|---|---|---|---|
| 10,309,980 | B2 * | 6/2019 | Fish | .......... H04W 4/90 |
| 2006/0268447 | A1 * | 11/2006 | Liao | .......... G01P 15/18 |
| | | | | 360/75 |
| 2007/0030587 | A1 * | 2/2007 | Noda | .......... G01P 15/0891 |
| | | | | 360/75 |
| 2009/0031803 | A1 * | 2/2009 | Noda | .......... G01P 15/18 |
| | | | | 73/488 |
| 2009/0315719 | A1 * | 12/2009 | Song | .......... G08B 21/0446 |
| | | | | 340/573.1 |
| 2020/0286357 | A1 * | 9/2020 | Vagelos | .......... G08B 25/10 |

FOREIGN PATENT DOCUMENTS

| | | |
|---|---|---|
| CN | 105551192 A | 5/2016 |
| CN | 105872962 A | 8/2016 |
| CN | 105894730 A | 8/2016 |
| CN | 205541294 U | 8/2016 |
| CN | 106652347 A | 10/2017 |

OTHER PUBLICATIONS

Chinese Office Action, Application No. 201710060140.1, dated Dec. 20, 2018, 6 pages.

Chinese Office Action, Application No. 201710060140.1, dated Apr. 4, 2018, 5 pages.

ISR/WO dated Feb. 8, 2018, PCT Application No. PCT/CN2017/109449, 6 pages.

* cited by examiner

SMART HELMET FALL DETECTION METHOD AND SMART HELMET

TECHNICAL FIELD

The present invention relates to the field of protection in sports, particularly to a smart helmet falling detection method and a smart helmet.

BACKGROUND

Riding is an outdoor sport in which people are always interested. The most incidental accident during the ride is falling and hitting the ground after being hit, and in case of serious collisions, it is likely to be unconscious or unable to move, thus it is impossible to ask for help and lose valuable rescue time, especially when an accident occurs in remote mountainous regions, it is more dangerous. Therefore, when falling occurs, if a related person can be timely notified to rescue, hazards caused by falling will be greatly reduced, therefore, it is necessary to detect and alarm the falling events.

However, in the existing falling detection technologies, there is no technology for detecting falling events of riders. There is a difference between the falling modes of Riders and common walking people, for example, their heights falling to the ground are not the same, moreover, it is also inconvenient for the riders to wear detecting equipment in sports, then it needs to consider installing the detecting equipment in other suitable positions.

SUMMARY

An object of the present invention lies in solving a problem of how to detect a falling event during riding process. The object of the present invention is achieved by the following technical solutions.

A smart helmet falling detection method includes following steps: monitoring acceleration of three axes according to a predetermined monitoring frequency; calculating a vector sum of the acceleration of the three axes, and determining whether a free fall event occurs according to whether the vector sum of the acceleration satisfies a first predetermined condition; determining whether a collision even occurs according to whether the acceleration of any axis of the three axes satisfies a second predetermined condition; determining whether a motionlessness event occurs according to whether an acceleration variation detected for each axis meets a third predetermined condition; and generating an emergency signal according to whether the motionlessness event meets a fourth predetermined condition.

In an implementation, the smart helmet falling detection method further includes: comparing a time interval between the collision event and the free fall event with a predetermined invalidation duration; and executing the step of determining whether a motionlessness event occurs according to a comparison result that the time interval is smaller than or equal to the invalidation duration, or returning to the step of monitoring acceleration of three axes according to a comparison result that the time interval is greater than the invalidation duration.

In an implementation, the first predetermined condition is that the vector sum of the acceleration is continuously smaller than a first threshold and a duration of the acceleration is greater than a first duration, the second predetermined condition is that the acceleration of the any axis is continuously greater than a second threshold and a duration of the acceleration is greater than a second duration, the third predetermined condition is that the acceleration variation is continuously smaller than a third threshold and a duration of the acceleration is greater than a third duration, and the fourth predetermined condition is that the motionlessness event takes place within a fourth duration after occurrence of the collision event, wherein the third duration is shorter than the fourth duration.

In an implementation, the first threshold is 0.3~0.6 g, and the first duration is 400 ms~500 ms; the second threshold is 1.5~2 g, and the second duration is 300 ms~450 ms; the third threshold is 0.3 g~0.6 g, and the third duration is 8~15 s; a difference between the fourth duration and the third duration is 2~5 s.

In an implementation, the first threshold is 0.54 g, the first duration is 450 ms, the second threshold is 1.992 g, the second duration is 400 ms, the third threshold is 0.5 g, the third duration is 11 s, and the fourth duration is 15 s.

In an implementation, the falling detection method further includes: detecting whether the motionlessness event occurs continuously; and generating an alarm cancellation signal if the motionlessness event is not detected continuously three times.

A smart helmet comprises: a three-axis acceleration sensor, configured to detect acceleration of three axes; and a controller, configured to monitor the acceleration of the three axes according to a predetermined monitoring frequency; calculate a vector sum of the acceleration of the three axes, and determine whether a free fall event occurs according to whether the vector sum of the acceleration satisfies a first predetermined condition; determine whether a collision even occurs according to whether the acceleration of any axis of the three axes satisfies a second predetermined condition; determine whether a motionlessness event occurs according to whether an acceleration variation detected for each axis meets a third predetermined condition; and generate an emergency signal according to whether the motionlessness event meets a fourth predetermined condition.

In an implementation, the first predetermined condition is that the vector sum of the acceleration is continuously smaller than a first threshold and a duration of the acceleration is greater than a first duration, the second predetermined condition is that the acceleration of the any axis is continuously greater than a second threshold and a duration of the acceleration is greater than a second duration, the third predetermined condition is that the acceleration variation is continuously smaller than a third threshold and a duration of the acceleration is greater than a third duration, and the fourth predetermined condition is that the motionlessness event takes place within a fourth duration after occurrence of the collision event, wherein the third duration is shorter than the fourth duration.

In an implementation, the smart helmet further includes a warning light, and the warning light is configured to turn on a falling warning lighting mode.

In one implementation, the smart helmet further comprises a GPS positioning module and a wireless communication module, the GPS positioning module is configured to send current geographical position information to the controller, and the wireless communication module is configured to send emergency information to a predetermined number via a mobile terminal associated with the smart helmet, wherein the emergency information carries the current geographical position information.

Compared with the prior art, for the smart helmet falling detection method and the smart helmet provided in the present invention, the acceleration is measured by the three-axis acceleration sensor installed on the smart helmet, and whether the falling event occurs is determined by analyzing change of the acceleration, and the alarm is given according to the falling event, such that the problem of falling detection and calling for help in a riding process is solved in a targeted manner.

The above description is merely summary of the technical solutions of the present invention, and in order to be capable of understanding the technical means of the present invention for implementation according to the contents in the specification, and in order to be capable of making the above and other objects, features, and advantages of the present invention more apparent and understandable, preferred examples are particularly illustrated below in cooperation with drawings to make detailed description below.

DETAILED DESCRIPTION OF THE EMBODIMENTS

The technical solutions in the embodiments of the present invention will be described clearly and completely below in combination with accompanying drawings in the embodiments of the present invention. Apparently, the embodiments described are merely for some of the embodiments of the present invention, rather than all of the embodiments. All the other embodiments that are obtained by a person skilled in the art without using inventive efforts on the basis of the embodiments in the present invention shall fall within the scope of protection of the present invention.

First Embodiment

Figure 1:
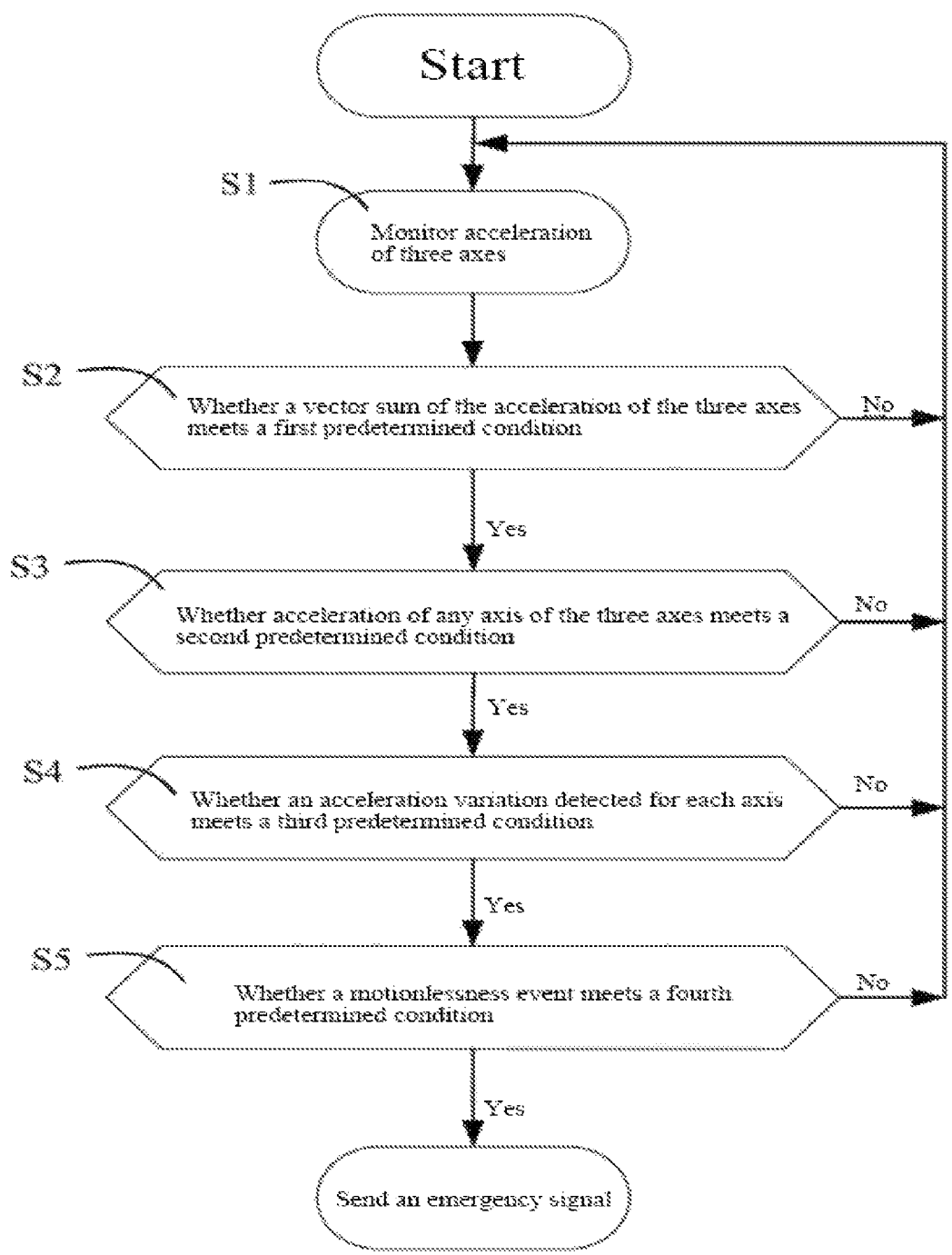
FIG. 1 is a flow diagram of a smart helmet falling detection method provided in a first embodiment of the present invention.

Please referring to FIG. 1, a smart helmet falling detection method provided in a first embodiment of the present invention includes Step S1~Step S5:

Step S1, monitoring acceleration of three axes according to a predetermined monitoring frequency;

Step S2, calculating a vector sum of the acceleration of the three axes, and determining whether a free fall event occurs according to whether the vector sum of the acceleration meets a first predetermined condition;

Step S3, determining whether a collision even occurs according to whether the acceleration of any axis of the three axes meets a second predetermined condition;

Step S4, determining whether a motionlessness event occurs according to whether an acceleration variation detected for each axis meets a third predetermined condition; and Step S5, generating an emergency signal according to whether the motionlessness event meets a fourth predetermined condition.

Prior to the Step S1, preferably, a three-axis acceleration sensor is initiated so as to accurately detect a falling event. In the Step S1, a controller monitors the acceleration of the three axes according to a certain frequency, wherein a monitoring frequency thereof may be the same as an output frequency of the three-axis acceleration sensor, and also may be different.

In the Step S2, the controller waits for occurrence of the free fall event meeting the first predetermined condition, wherein the first predetermined condition is that the vector sum of the acceleration is continuously smaller than a first threshold and a duration of the acceleration is greater than a first duration. A specific first threshold and a specific first duration are established according to riding characteristics. In the present embodiment, according to a height range of riders in riding, the first threshold (Thresh-FF) is set as 0.3~0.6 g, where g represents acceleration of gravity, and the first duration (Time-FF) is set as 400 ms~500 ms. Preferably, the first threshold is 0.54 g, and the first duration is 450 ms. When the vector sum of the acceleration is continuously smaller than the first threshold and a duration of the acceleration is greater than the first duration, the free fall event occurs. If no free fall event occurs, return to the Step S1.

In the Step S3, the controller waits for occurrence of the collision event satisfying the second predetermined condition, wherein the second predetermined condition is that the acceleration of the any axis is continuously greater than a second threshold and a duration of the acceleration is greater than a second duration. A specific second threshold and a specific second duration are established according to riding characteristics. In the present embodiment, according to a riding speed range of riders, the second threshold (Thresh-Act) is set as 1.5~2 g, and the second duration (Time-Act) is set as 300 ms~450 ms. Preferably, the second threshold is 1.992 g, and the second duration is 400 ms. When the acceleration of any axis (collision may take place in any direction) is greater than the second threshold and a duration of the acceleration is greater than the second duration, it is considered that the rider falls on the ground, and a collision event occurs. If no collision event occurs, return to the Step S1.

In the Step S4, the controller waits for occurrence of the motionlessness event satisfying the third predetermined condition, wherein the third predetermined condition is that the acceleration variation is continuously smaller than a third threshold and a duration of the acceleration is greater than a third duration. In the present embodiment, the third threshold (Thresh-Inact) is set as 0.3~0.6 g, and the third duration (Time-Inact) is set as 8~15 s. Preferably, the third threshold is 0.5 g, and the third duration is 11 s. When a change variable of the acceleration of each axis is smaller than the third threshold and a duration of the acceleration is greater than the third duration, the motionlessness event occurs. The change variable refers to a difference value between a maximal value and a minimal value detected at least within a range of the third duration, and during the third duration, the rider barely moved, indicating that the rider is most likely to be in an unconscious or unable to move.

In the Step S5, considering that motionlessness at least within the third duration will not occur immediately after a rider falls down at a riding speed and then hits the ground, and that the rider will be motionless after rolling for a certain time period to a great extent, the fourth predetermined condition needs to be set for reasonable determination. In the present embodiment, the fourth predetermined condition specifically is adding a period of buffer time after the occurrence of the collision event, that is, if the motionlessness event takes place within the fourth duration after the occurrence of the collision event, it means that all of three events, free fall-collision-motionlessness, happen, the rider has fallen down, and the emergency signal needs to be sent.

The emergency signal is sent by the controller in a way of sending a control signal to a corresponding emergency module, wherein a form of the emergency signal is unlimited, for embodiment, an emergency sound and a light indication are sent, a report is made to a cellphone which sends an emergency message or make an emergency call, and so on. In the present embodiment, a difference between the fourth duration and the third duration is 2~5 s. Preferably, the fourth duration is 15 s.

If none of the above events meets a corresponding predetermined condition, it means that the falling event does not exist, and the acceleration of the three axes continues to be monitored.

Figure 2:
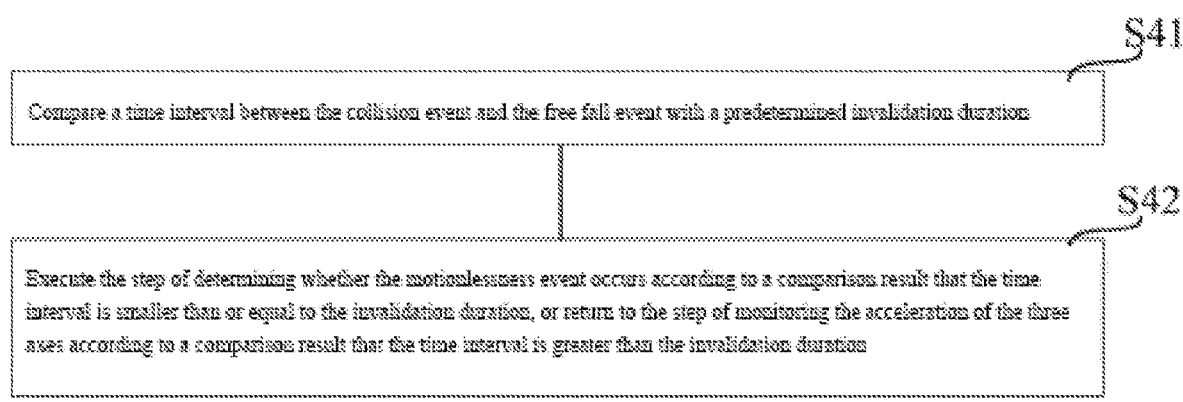
FIG. 2 is a flow diagram of an implementation of Step S4 in the smart helmet falling detection method provided in the first embodiment of the present invention.

In order to further precisely determine correlation between the free fall event and the collision event during riding, preferably, please referring to FIG. 2, the Step S4 further includes Step S41~Step S42:

Step S41, comparing a time interval between the collision event and the free fall event with a predetermined invalidation duration; and Step S42, executing the step of determining whether the motionlessness event occurs according to a comparison result that the time interval is smaller than or equal to the invalidation duration, or returning to the step of monitoring the acceleration of the three axes according to a comparison result that the time interval is greater than the invalidation duration.

In the Step S41, the invalidation duration is set, for example 200 ms, that is, the time interval between the collision event and the free fall event is smaller than 200 ms, it means that there is strong correlation between free fall and collision, and occurrence of the motionlessness event can be waited for. If the time interval between the collision event and the free fall event exceeds 200 ms, it means that there is only free fall but no collision, then it can be considered that there is no correlation between free fall and collision, and the acceleration continues to be monitored.

Preferably, after the emergency signal is sent, it further can be detected whether the motionlessness event takes place continuously; and if the motionlessness event is not detected continuously three times, it means that a person falling down can move, then an alarm cancellation signal is generated, and the monitoring is continued after the three-axis sensor is initiated.

To sum up, in the smart helmet falling detection method provided in the embodiment of the present invention, the acceleration is measured by the three-axis acceleration sensor installed on the smart helmet, and whether the falling event occurs is determined by analyzing a changing situation of the acceleration of the falling event in the riding, and the alarm is given according to the falling event, such that the problem of falling detection and calling for help in a riding process is solved in a targeted manner.

Second Embodiment

Figure 3:
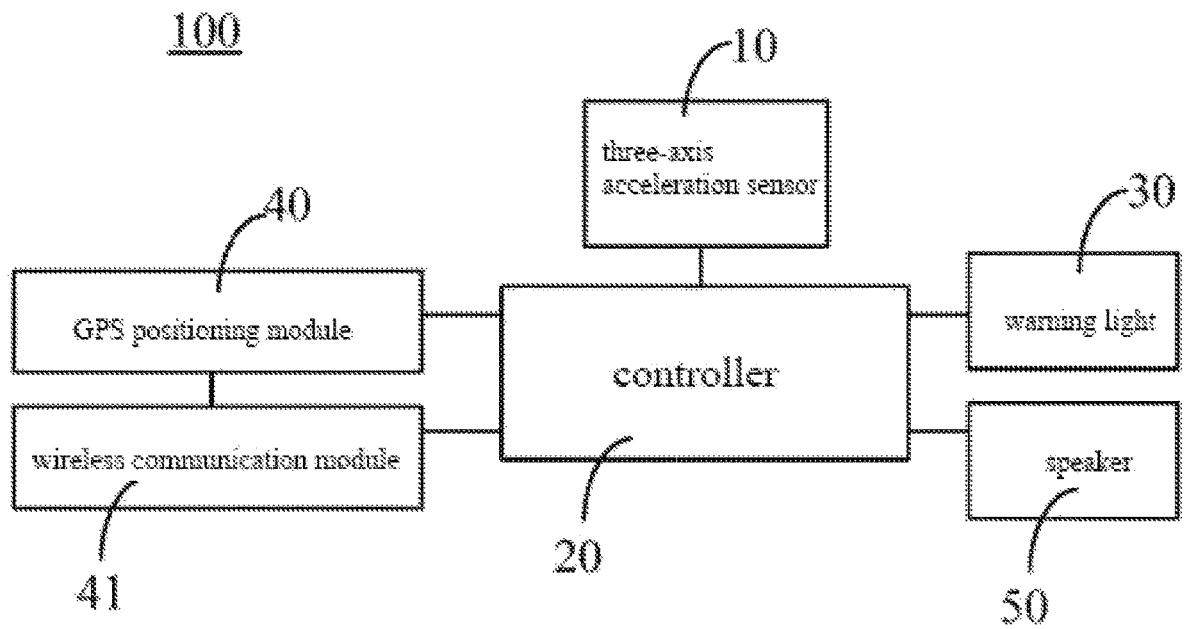
FIG. 3 is a structural schematic diagram of a smart helmet provided in a second embodiment of the present invention.

Pleasing referring to FIG. 3, a smart helmet 100 provided in a second embodiment of the present invention includes a three-axis acceleration sensor 10 and a controller 20, wherein the three-axis acceleration sensor 10 is configured to detect acceleration of three axes, and the controller 20 is configured to: monitor the acceleration of the three axes according to a predetermined monitoring frequency; calculate a vector sum of the acceleration of the three axes, and determine whether a free fall event occurs according to whether the vector sum of the acceleration satisfies a first predetermined condition; determine whether a collision event occurs according to whether the acceleration of any axis of the three axes satisfies a second predetermined condition; determine whether a motionlessness event occurs according to whether an acceleration variation detected for each axis meets a third predetermined condition; and generate an emergency signal according to whether the motionlessness event meets a fourth predetermined condition.

In the above, the first predetermined condition is that the vector sum of the acceleration is continuously smaller than a first threshold and a duration of the acceleration is greater than a first duration, the second predetermined condition is that the acceleration of the any axis is continuously greater than a second threshold and a duration of the acceleration is greater than a second duration, the third predetermined condition is that the acceleration variation is continuously smaller than a third threshold and a duration of the acceleration is greater than a third duration, and the fourth predetermined condition is that the motionlessness event occurs within a fourth duration after the collision event occurs, wherein the third duration is shorter than the fourth duration.

In the above, the first threshold is 0.3~0.6 g, and the first duration is 400 ms~500 ms; the second threshold is 1.5~2 g, and the second duration is 300 ms~450 ms; the third threshold is 0.3 g~0.6 g, and the third duration is 8~15 s; a difference between the fourth duration and the third duration is 2~5 s.

Preferably, the first threshold is 0.54 g, the first duration is 450 ms, the second threshold is 1.992 g, the second duration is 400 ms, the third threshold is 0.5 g, the third duration is 11 s, and the fourth duration is 15 s.

The controller 20 is further configured to compare a time interval between the collision event and the free fall event with a predetermined invalidation duration; and execute the step of judging whether the motionlessness event occurs according to a comparison result that the time interval is smaller than or equal to the invalidation duration, or return to the step of monitoring the acceleration of the three axes according to a comparison result that the time interval is greater than the invalidation duration, and is configured to detect whether the motionlessness event occurs continuously; and generate an alarm cancellation signal to stop the emergency signal if the motionlessness event is not detected continuously three times.

The smart helmet 100 further comprises a warning light 30, and the warning light 30 is configured to turn on a falling warning lighting mode, for example, a flashing mode, a flickering mode, or an SOS emergency mode and so on.

The smart helmet 100 further comprises a GPS positioning module 40 and a wireless communication module 41, wherein the GPS positioning module 40 is configured to send current geographical position information to the controller 20, and the wireless communication module 41 is configured to send emergency information to a predetermined number via a mobile terminal associated with the smart helmet, wherein the emergency information carries the current geographical position information.

The smart helmet 100 can be connected with a cellphone via the wireless communication module 41, for embodiment, a Bluetooth module, a control signal sent by the controller 20 controls the cellphone to send the emergency information to a predetermined number (for embodiment, a number of an emergency contact registered by the rider or a number of an emergency center), wherein the emergency information includes emergency message or emergency phone call. The smart helmet 100 further includes a speaker 50, and the speaker 50 is configured to send an alarm sound.

To sum up, the smart helmet provided in the embodiment of the present invention measures the acceleration by installing the three-axis acceleration sensor on the smart helmet, judges whether the falling event occurs by analyzing a changing situation of the acceleration, and gives an alarm according to the falling event, such that the problem of falling detection and calling for help in a riding process is solved in a targeted manner.

The above embodiments merely express several embodiments of the present invention, and the description thereof is relatively concrete and detailed, but it should not be thereby construed as limitation on the scope of the present patent for invention. It should be indicated that for a person ordinarily skilled in the art, several alterations and improvements can be further made without departing from the concept of the present invention, all of which fall within the scope of protection of the present invention. Therefore, the scope of protection of the present patent for invention should be based on the attached claims.

What is claimed is:

1. A smart helmet falling detection method, characterized by including following steps: monitoring acceleration of three axes according to a predetermined monitoring frequency; calculating a vector sum of the acceleration of the three axes, and determining whether a free fall event occurs according to whether the vector sum of the acceleration satisfies a first predetermined condition; determining whether a collision even occurs according to whether the acceleration of any axis of the three axes satisfies a second predetermined condition; determining whether a motionlessness event occurs according to whether an acceleration variation detected for each axis meets a third predetermined condition; and generating an emergency signal according to whether the motionlessness event meets a fourth predetermined condition.

2. The smart helmet falling detection method according to claim 1, characterized in that the smart helmet falling detection method further including: comparing a time interval between the collision event and the free fall event with a predetermined invalidation duration; and executing the step of determining whether a motionless event occurs according to a comparison result that the time interval is smaller than or equal to the invalidation duration, or returning to the step of monitoring acceleration of three axes according to a comparison result that the time interval is greater than the invalidation duration.

3. The smart helmet falling detection method according to claim 1, characterized in that the first predetermined condition is that the vector sum of the acceleration is continuously smaller than a first threshold and a duration of the acceleration is greater than a first duration, the second predetermined condition is that the acceleration of the any axis is continuously greater than a second threshold and a duration of the acceleration is greater than a second duration, the third predetermined condition is that a change variable of the acceleration is continuously smaller than a third threshold and a duration of the acceleration is greater than a third duration, and the fourth predetermined condition is that the motionlessness event takes place within a fourth duration after occurrence of the collision event, wherein the third duration is shorter than the fourth duration.

4. The smart helmet falling detection method according to claim 3, characterized in that the first threshold is 0.3~0.6 g, and the first duration is 400 ms~500 ms; the second threshold is 1.5~2 g, and the second duration is 300 ms~450 ms; the third threshold is 0.3 g~0.6 g, and the third duration is 8~15 s; a difference between the fourth duration and the third duration is 2~5 s.

5. The smart helmet falling detection method according to claim 4, characterized in that the first threshold is 0.54 g, the first duration is 450 ms, the second threshold is 1.992 g, the second duration is 400 ms, the third threshold is 0.5 g, the third duration is 11 s, and the fourth duration is 15 s.

6. The smart helmet falling detection method according to claim 1, characterized in that the falling detection method further including: detecting whether the motionlessness event occurs continuously; and generating an alarm cancellation signal to stop the emergency signal if the motionlessness event is not detected continuously three times.

7. A smart helmet, characterized in that the smart helmet comprising: a three-axis acceleration sensor, being configured to detect acceleration of three axes; and a controller, being configured to monitor the acceleration of the three axes according to a predetermined monitoring frequency; calculating a vector sum of the acceleration of the three axes, and determining whether a free fall event occurs according to whether the vector sum of the acceleration satisfies a first predetermined condition; determining whether a collision even occurs according to whether the acceleration of any axis of the three axes satisfies a second predetermined condition; determining whether a motionlessness event occurs according to whether an acceleration variation detected for each axis meets a third predetermined condition; and generate an emergency signal according to whether the motionlessness event meets a fourth predetermined condition.

8. The smart helmet according to claim 7, characterized in that the first predetermined condition is that the vector sum of the acceleration is continuously smaller than a first threshold and a duration of the acceleration is greater than a first duration, the second predetermined condition is that the acceleration of the any axis is continuously greater than a second threshold and a duration of the acceleration is greater than a second duration, the third predetermined condition is that the acceleration variation is continuously smaller than a third threshold and a duration of the acceleration is greater than a third duration, and the fourth predetermined condition is that the motionlessness event takes place within a fourth duration after occurrence of the collision event, wherein the third duration is shorter than the fourth duration.

9. The smart helmet according to claim 7, characterized in that the smart helmet further comprising a warning light being configured to turn on a falling warning lighting mode.

10. The smart helmet according to claim 7, characterized in that the smart helmet further comprising a GPS positioning module and a wireless communication module, the GPS positioning module being configured to send current geographical position information to the controller, and the wireless communication module being configured to send emergency information to a predetermined number via a mobile terminal associated with the smart helmet, wherein the emergency information carries the current geographical position information.

* * * * *